March 29, 1966 J. P. CHISHOLM 3,243,816
FINAL APPROACH LANDING SYSTEM
Filed June 8, 1962 5 Sheets-Sheet 1

INVENTOR.
JOHN P. CHISHOLM
BY
Alexander & Dowell
ATTORNEYS

March 29, 1966 J. P. CHISHOLM 3,243,816
FINAL APPROACH LANDING SYSTEM
Filed June 8, 1962 5 Sheets-Sheet 2

(ON GLIDE PATH)
Fig. 5

(ABOVE GLIDE PATH)
Fig. 6

(BELOW GLIDE PATH)
Fig. 7

(REFLECTORS A,E,F,& G)
Fig. 8

(REFLECTOR C)
Fig. 9

(REFLECTOR B)
Fig. 10

(REFLECTOR D)
Fig. 11

INVENTOR.
JOHN P. CHISHOLM
BY
Alexander & Dowell
ATTORNEYS

March 29, 1966  J. P. CHISHOLM  3,243,816
FINAL APPROACH LANDING SYSTEM
Filed June 8, 1962  5 Sheets-Sheet 3

INVENTOR.
JOHN P. CHISHOLM
BY
Alexander & Dowell
ATTORNEYS

INVENTOR.
JOHN P. CHISHOLM

March 29, 1966  J. P. CHISHOLM  3,243,816
FINAL APPROACH LANDING SYSTEM
Filed June 8, 1962  5 Sheets-Sheet 5

INVENTOR.
JOHN P. CHISHOLM
BY
*Alexander & Dowell*
ATTORNEYS 3,243,816
FINAL APPROACH LANDING SYSTEM
John P. Chisholm, Buffalo, N.Y., assignor to Sierra Research Corporation, Buffalo, N.Y., a corporation of New York
Filed June 8, 1962, Ser. No. 201,094
27 Claims. (Cl. 343—18)

This invention relates to systems for aiding in the final approach of aircraft to a landing strip, and more particularly relates to novel systems of ground reflectors located along the landing strip runway and cooperating with radar in an approaching aircraft to provide the pilot with guidance information indicating the azimuth position of the aircraft with respect to the runway and indicating whether the aircraft is approaching the runway along a predetermined glide path, or is above or below that glide path.

At the present time most of the larger commercial and military aircraft are provided with radar equipment, of which the AN/APN-59 is a typical example, this radar being located in the nose of the aircraft and scanning a large sector ahead of the aircraft with a relatively narrow beam, of approximately three degrees in the case of the AN/APN-59, this radar operating in X-band with a short pulse duration of .35 microsecond. A radar of this type has excellent resolution sufficient to enable it to pick out and display a plurality of ground reflectors with sufficient definition to separate reflectors that are approximately 1000 feet apart on the ground at a range of four nautical miles, or less.

The present invention teaches a system of ground-located reflectors mutually separated by such distances that they can be distinguished from each other by aircraft radar during final-approach maneuvers, and illustrates several embodiments of the system, including a first embodiment whereby the ground-located reflectors are used in cooperation with conventional aircraft radar of the type mentioned above without requiring modification of the latter in order to provide final-approach information, and a second, more sophisticated embodiment of this system which accomplishes the same purpose, but which requires a relatively small modification of the aircraft radar in order to make it cooperate in a special way with modulated ground reflectors to display on the radar indicator unit a presentation including only echoes from the ground-located reflectors operating as beacons while completely eliminating indications representing other echoes from other reflective targets.

In all these embodiments of the invention, plural reflectors are located in two rows along opposite sides of the runway parallel thereto, and at each end of the runway at least one reflector is located to mark the extreme ends thereof. Although the principal function of the reflectors marking the ends of the runway is to complete the display of its general location on the indicator unit of the radar, the reflectors located along the sides of the runway not only mark the sides thereof on the display so as to provide an azimuth indication of the location of the runway with respect to the aircraft, but in addition these side reflectors are provided with lobes and nulls in their reflective patterns which are arranged along upwardly inclined lines extending toward approaching aircraft to provide the pilot in the aircraft with vertical guidance information by which he can determine whether he is above or below the prescribed glide path while approaching the runway and by which he can correct his altitude so as to place himself on the prescribed glide path, these reflectors also informing him when he is in fact in said glide path.

It is accordingly a principal object of this invention to provide a simple and accurate system in which reflectors disposed around the runway cooperate with airborne radar to provide both azimuth and vertical glide-path information during the final approach of the aircraft.

It is another important object of the invention to provide on the same runway two distinct and non-interfering sets of reflectors each of which functions as a final-approach landing aid for aircraft approaching the runway in one of two opposite directions, and in which the reflectors which function to guide aircraft approaching in one direction are substantially inoperative and non-reflective when illuminated by the radar of aircraft approaching in the other direction, whereby both sets of oppositely facing reflectors can be provided on each runway without mutual interference.

It is another important object of this invention to provide individual reflectors, within each system of reflectors, with sufficient mutual spacing so that within the range of greatest need of these reflectors, for instance within about four nautical miles of touchdown, these reflectors can be individually distinguished by conventional present-day aircraft radar, and wherein the distance of such mutual separation is well within a practical range of distances on an average runway, whereby a sufficient number of the reflectors can easily be provided. For instance, if the separation between reflectors has to be 1000 feet in order to cooperate with a conventional radar having the resolving power set forth above with respect to the AN/APN-59, on a runway which is one mile in length, as many as 30 reflectors could be placed on each side thereof, which number is tremendously in excess of the actual number of reflectors required to satisfactorily perform the desired function.

It is another important object of this invention to provide a system in which the ground reflectors can be spaced apart sufficiently to prevent scintillation effects on the screen of the presentation unit in the aircraft. Where the reflectors in each side row are spaced longitudinally by 200-foot intervals, these intervals are slightly more than the pulse width of the AN/APN-59 radar, its pulse width of .35 microsecond being equal to about 175-foot intervals. This spacing of more than a pulse width prevents scintillation problems between reflectors in the same row because the radar pulse can only illuminate one reflector in a row at a time. The spacing between the rows transversely of the runway is conveniently selected at 1200 feet, and since the radar antenna beam-width in the azimuth plane is only about three degrees, the radar will easily see these two rows of reflectors as separate at ranges of four nautical miles or less. Thus, at this distance the display will be resolved into two parallel rows representing opposite sides of the runway.

In the present system the reflectors are faced in such a direction that they can receive radiation from the radar of an approaching aircraft and reflect some of that radiation for presentation to the pilot, but not all of the reflectors can provide echoes to an aircraft at one instant of time. The radiation pattern in the horizontal plane of the reflectors should cover an arc of about 90° for easy acquisition of the pattern by the approaching aircraft, and in the vertical plane the two reflectors which are located at the ends of the runway are provided with a fairly great angular coverage so that they can be easily intercepted and seen by an approaching aircraft's radar. Likewise, the first and the last reflector in each of the side rows of reflectors along the runway are also provided with a fairly great angular coverage in the vertical plane so that the aircraft will be provided with a presentation at least of these end markers provided it is reasonably close to the intended glide path. However, the intermediate reflectors in each of the side rows are provided with progressively different vertical-plane patterns of reflection so that at least one of these intermediate reflectors will at all times appear to be missing on the radar presentation, and this missing reflector on each side of the runway will provide an indication of the glide path along which the aircraft is actually approaching. In general, if the missing reflectors appear to be near the approach-end of the runway, the aircraft is then below the guide path; if the missing reflectors appear to be in the exact center of the row of reflectors on each side of the runway, the aircraft is exactly on the prescribed glide path; but if the missing reflectors appear to be near the far ends of the rows of reflectors, the aircraft is then high and should descend in order to arrive at the correct glide path. It is the responsibility of the pilot to maintain the aircraft on a glide-angle of three degrees, and the present system does not indicate whether or not the angle of approach of the aircraft is correct, but assumes that this angle is maintained by the pilot. Then, based on this assumption, the present system tells the pilot whether he is on the glide path which will lead to the prescribed touch-down point on the runway.

This type of indication results from providing the intermediate reflectors in the side rows with radiation patterns in the vertical plane such that some of the reflectors can radiate signals back to the aircraft only if it is below or on the prescribed glide path; others of the reflectors have radiation patterns in the vertical plane such that they can reflect signals back to the aircraft only if the aircraft is high or on the desired glide path; and at least one of the reflectors in each side row has a notch or a null in its radiation pattern in the vertical plane such that it appears missing on the radar presentation only if the aircraft is exactly on the prescribed glide path. The number of reflectors actually employed in each side row can be varied considerably depending upon the coverage of the landing pattern which is required at a particular installation.

The above system can be illustrated in side elevation taken parallel to the length of the aircraft runway and showing rows of side beacons along the runway by representing the radiation patterns as lines extending from the respective reflectors diagonally upwardly at an angle of 3° in the direction of an approaching aircraft. These patterns of the side reflectors which are located in rows parallel to the runway can be used to define the altitude of the approaching aircraft by using the reflection patterns thereof in the vertical plane. For instance, an aircraft approaching along the prescribed glide path would be in the null of the center side-reflector, but would receive signals from all of the other reflectors. The echo from each reflector is sequentially received in the aircraft in a time sequence which can be assumed to be essentially linear because of the smallness of the glide angle of 3°. The coordinate system employed can be considered as substantially rectangular due to the smallness of this approach angle, and it can be further assumed, in one embodiment of the invention, that the null lines from each of the reflectors are substantially parallel and about 10-feet apart independent of the distance from touch-down, within reasonable limits. Thus, depending on which of the reflectors is missing in the presentation, the pilot knowns that he is an even multiple of 10-feet above or below the desired glide path, depending on how many reflectors away from the center reflector the missing reflector is located. This system is of interest theoretically but the fact that these null lines are so close together can make interception of the entire glide pattern somewhat difficult for an approaching aircraft.

It is therefore another object of the present system to provide a more practical embodiment in which the sequentially appearing null lines are somewhat divergent from the 3° pattern in the vertical plane so as to provide a greater angular coverage at the outer limits of the range for easy capture of the approach pattern by the aircraft, these divergent null lines providing a larger pattern at greater ranges, but being diverged to such a slight extent as not to substantially alter the almost-rectangular properties of the system at short ranges so that the overall system gain will not diverge close to touchdown, as normally occurs in other instrument landing systems for finding and maintaining a desired glide slope.

The interception of the approach pattern by the aircraft is assisted with respect to azimuth angles by providing the individual reflector with a 90° horizontal radiation pattern whereby capture of the pattern in the lateral plane can be had from a relatively wide approach angle. The position of the echoes from all of the reflectors on the face of the plan position indicator (P.P.I.) will indicate to the pilot immediately whether he is correctly approaching the runway in the azimuth plane.

There are several different ways of providing the null lines in the reflection patterns of the side reflectors, one way being to provide each of the side reflectors with a sharply defined null or notch in its reflection pattern, each null line making an angle of 3° with respect to horizontal and facing toward the approaching aircraft. With this type of pattern, the aircraft radar will see reflections from all of the side reflectors except that reflector in whose null zone the aircraft is actually located at a particular moment. Another convenient way, discussed above, is to provide the center reflector in each side row with a sharply defined notch or null at an angle of 3° in the vertical plane and to provide the reflectors located nearer the approaching aircraft from that center reflector with patterns including and above the 3° angle so that the aircraft will see these reflectors only when it is on the prescribed approach path or above it, and to provide the reflectors located farther from the aircraft than the center reflector with lobes in their reflective pattern which are at and below the 3° approach path so that these reflectors are seen only when the aircraft is below the prescribed approach path.

As was briefly suggested above the individual reflectors can either be passive reflectors, or else they can be modulated so as to perform a beacon function whereby, when cooperating with a somewhat modified radar in the aircraft, only the beacon responses are displayed on the indicator unit so as to eliminate all other targets which might tend to be confused with the final-approach landing information. Reflective beacons of the general type referred to herein are shown and described in co-pending patent applications of John P. Chisholm, Serial Number 66,547, filed November 1, 1960 and relating to Frequency Shift Reflector Systems, now patent 3,108,275, and Serial Number 133,721, filed August 24, 1961 and relating to Wide-Angle Electrically-Modulated Reflectors, now Patent 3,158,862. These co-pending applications teach reflector systems cooperating with conventional radar which is modified to provide two different local oscillator frequencies in the receiver, these frequencies being selectable one to the exclusion of the other, and one of these frequencies being the local oscillator frequency required to receive and detect ordinary echoes arriving at the radar from ordinary reflection targets, and the other local oscillator frequency being such frequency as is required to receive and detect only echoes which have had their frequencies shifted so as to be different from the frequency of the original pulse sent out by the radar. This latter mode of operation, referred to as a beacon mode as distinguished from a normal radar mode of operation, requires that there be certain reflectors serving as beacons and provided with means for modulating the reflectivity of the beacon at a radio-frequency rate which is of high enough frequency that it can be selected by the IF amplifiers of the radar receiver while at the same time the latter rejects other echoes received at the nominal frequency of the radar pulse. Such beacon reflectors are highly useful in the present system since they can reflect either the radar pulse frequency, or this frequency plus and minus side bands which differ from the radar frequency by a local modulating frequency which is used to modulate the reflectivity of the beacon. Where this latter type of reflector is used, it is useful both to aircraft equipped with ordinary radar capable of receiving and detecting only echoes returned at the same frequency as the outgoing radar pulse, and also to aircraft equipped with radar which has been modified to receive and detect signals corresponding with the frequency of the radar transmitter plus or minus a modulating frequency used to modulate the reflectivity of the ground beacons. The aircraft equipped with ordinary radar will see the beacons merely as additional targets arranged in rows alongside the runway; and the aircraft equipped with special radar which can perform a beacon function will see these modulated reflectors either as ordinary targets along with all of the other targets and ground clutter appearing on the presentation unit of the radar, or alternatively can be switched over to the beacon function in which case the radar will see only these beacons which are so modulated.

It is an object of this invention to provide a landing system of beacons cooperating with airborne radar to eliminate other reflectors and ground clutter from the radar presentation so as to emphasize the landing aid beacons at that particular runway.

Still another important object of my invention is to provide means for blinking the reflectivity of the re-reflectors and/or beacons so as to provide additional means for identifying these beacons and distinguishing them from other ground reflections. The blinking of the reflectivity of these beacons would then provide an easy way for aircraft equipped with ordinary radar which is incapable of performing a purely beacon function to identify the landing system reflectors and distinguish them from other ground targets.

Other objects and advantages of this invention will become apparent during the following discussion of the drawings wherein.

Figure 1:
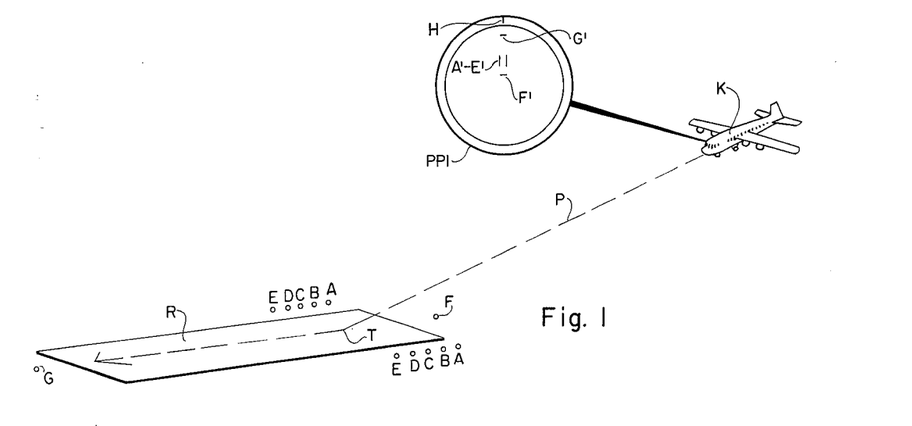
FIG. 1 is a perspective diagram illustrating the basic principles of the system.
Figure 13:
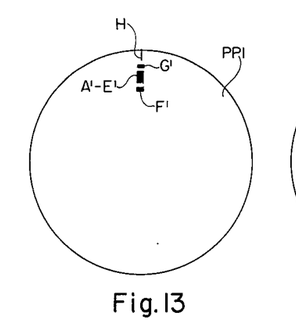
FIGS. 13, 14 and 15 show three successive P.P.I. presentations as the aircraft approaches touchdown.
Figure 14:
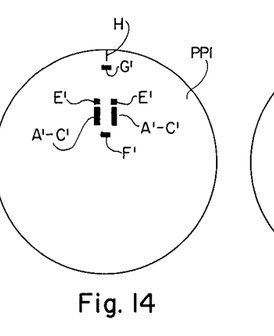
Figure 15:
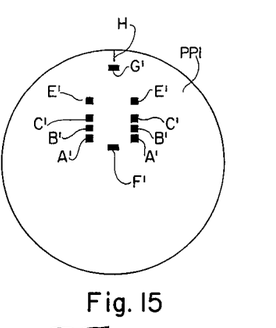

Referring now to FIG. 1, this figure illustrates the general principles of the system with reference to an aircraft K approaching a runway R along a glide path P toward a touchdown point T. The runway is flanked by two identical side rows of reflectors respectively labeled A, B, C, D and E, and in addition the front of the runway is marked with a reflector F and the far end of the runway is marked with a reflector G. Only the reflectors which are useful to aircraft approaching along the glide path P are shown in this figure, although another set of similar but oppositely facing reflectors would be used as a landing aid for aircraft approaching the runway from the opposite direction. Undoubtedly the same reflectors F and G could serve in both systems on a single runway as reflectors marking the ends of the runway, but different side reflectors would have to be used due to different placement thereof and differently directed reflector lobes, as will presently become apparent during the discussion of FIGS. 2 and 3. The upper part of FIG. 1 includes a pictorial representation of a P.P.I. indication on the radar indicator unit within the aircraft K, from which it can be seen that the pilot sees the runway front reflector at F' on the P.P.I. indicator, that he sees at G' the marker G at the far end of the runway, and that this marker is near the heading marker H on the P.P.I. screen. Assuming that the aircraft K is still a considerable distance from touchdown, the side marks A through E will appear as the marks A' through E' all run together on the screen, this indication being sufficient to bring the aircraft near the beginning of the final glide path approach. As the aircraft approaches the field, the definition of the individual markers will become greater due to the increased resolution ability of the radar as the range between the markers and the aircraft closes. This sequence is illustrated in FIGS. 13, 14 and 15, to be discussed hereinafter.

Figures 2, 3:
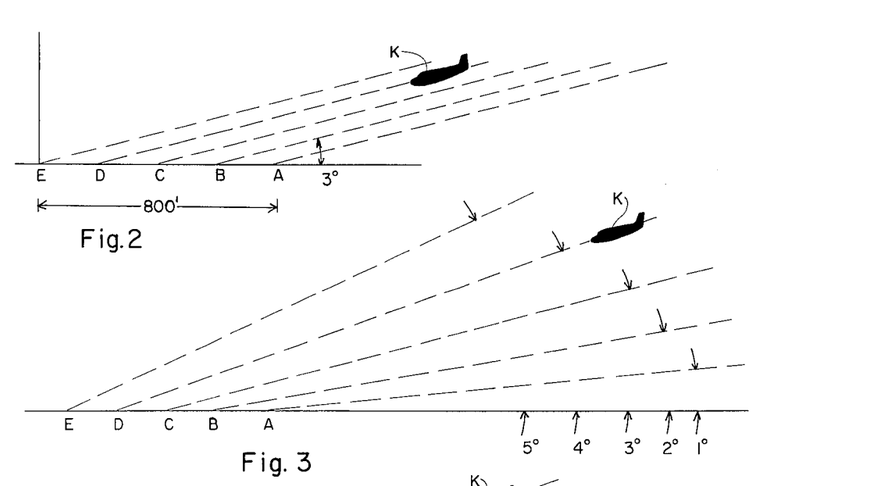
FIG. 2 is a graphical illustration of one possible arrangement of nulls in the reflective patterns for the reflectors along the sides of the runway.
FIG. 3 is a diagram similar to FIG. 2 but showing a modified and divergent pattern of nulls for the side reflectors.

FIG. 2 graphically illustrates the direction of reflection of the reflectors A, B, C, D and E, although on a considerably exaggerated basis representing the null or notch in each reflective pattern which is generally directed at about 3° above the horizontal so as to correspond with the normal glide path angle of 3° which is substantially standard in the landing of large aircraft.

In the illustration of FIG. 2, it appears that all of the reflective patterns have nulls which make the same angle with respect to the horizontal as the aircraft approaches, but in FIG. 3 a further modified pattern is illustrated in which the successive reflectors have null lines which mutually diverge in the vertical plane so as to form an overall pattern which fans out and thereby makes it easier for an aircraft to intercept the pattern initially when still a considerable distance from the airport, only the null line from the reflector C making an angle of 3° with respect to horizontal.

Figure 4:
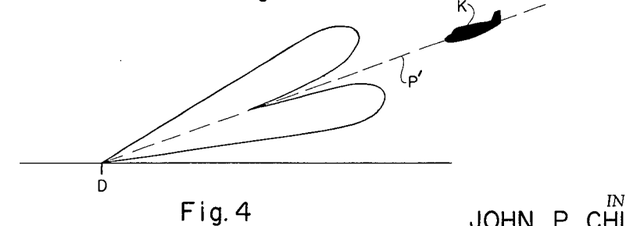
FIG. 4 is a diagram of the reflective pattern of a reflector having a notch or null located between two reflective lobes.

FIG. 4 shows a reflection pattern which is suitable for use in connection with the landing patterns illustrated in FIGS. 2 and 3. In FIG. 4 the pattern of the reflector is illustrated as having two reflective lobes separated by a sharp null, and this sharp null occurs in the vicinity of the 3° glide path P'. Thus, an aircraft landing along the glide path P' will not see the reflector D.

Figure 5:
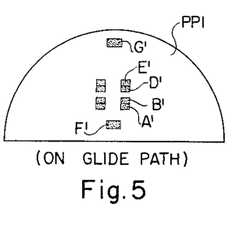
FIGS. 5, 6 and 7 are partial views of three different P.P.I. indications which can be seen on the aircraft radar depending on whether the aircraft is on, above, or below the prescribed glide path.
Figure 6:
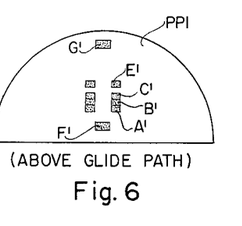
Figure 7:
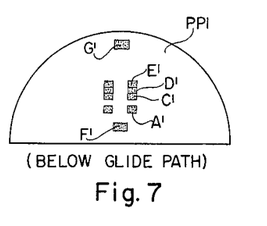
Figure 8:
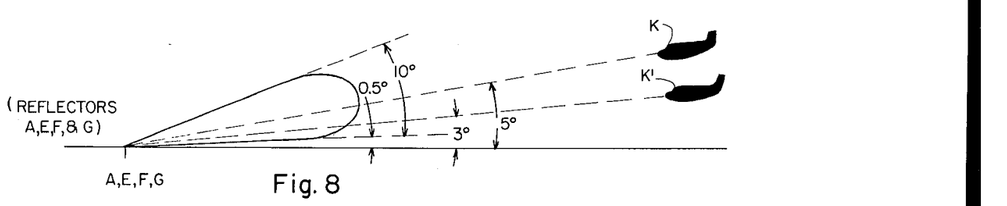
FIGS. 8, 9, 10 and 11 are diagrams showing a further modified form of reflective patterns for the various reflectors of the landing system.

However, although the aircraft K, FIG. 2, is in the null of the reflector D and therefore will not see it, it is not in the null of the reflectors A, B, C and E, and therefore these reflectors will appear on the radar screen, whereas the reflector D will be missing therefrom. This type of indication can be seen in FIG. 6. From this information the pilot can tell that he is too high and therefore should descend somewhat until he is on the glide path of the center side reflector C so that only the signal from the reflector C will be missing, as shown in FIG. 5. Note that the missing reflector in the group of reflectors indicates which of the glide paths the aircraft K is following. If the aircraft is too low, assuming that he is on the glide path leading toward the reflector B, then the pilot will not see a return from this reflector but will see the display shown in FIG. 7 in which reflections A', C', D' and E' are present, but reflection B' is absent. The pilot then knows that he must level off until he reaches the glide path leading to the reflector C, and then return to his 3° glide angle and descend so as to stay on this glide path.

For use in the system having the characteristic shown in FIG. 2, the reflectors A through E inclusive can all have patterns similar to that shown in FIG. 4, or alternatively the reflectors B, C and D can have patterns of the type shown in FIG. 4, and reflectors A and E can be provided with a pattern which differs from that shown in FIG. 4 because it does not have the notch or null line extending thereinto. In this manner, the end reflectors in each side row will always be visible to the pilot as long as he is within the general field of coverage of the system.

Figure 9:
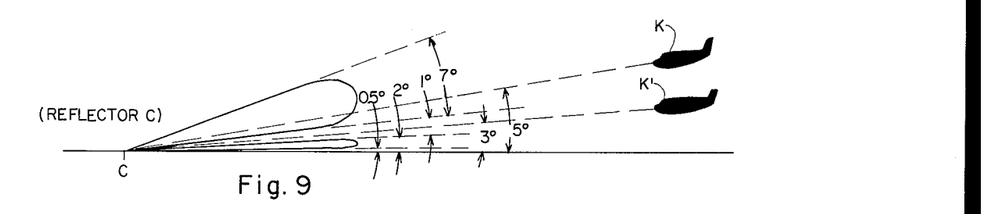

On the other hand, a divergent and perhaps more satisfactory system is provided by using divergent null lines as shown in the pattern of FIG. 3. Assuming that it is desired to cover approaching aircraft on glide paths located between half a degree and 10 degrees with respect to the horizontal, the said reflectors can be used to advantage as shown in FIGS. 8, 9, 10 and 11. In general, it is desirable to have the aircraft K see the end reflectors F and G of the runway at all times, and also to see the extreme reflectors A and E on the side rows at all times. Therefore, a reflector having the pattern shown in FIG. 8 would be satisfactory for use at the positions labeled A, E, F and G in FIG. 1. The vertical coverage of this reflector would be from about half a degree to about 10 degrees. In the case of the reflector C which marks the desired glide path, this reflector should be absent on the P.P.I. indication whenever the aircraft is on this desired glide path, and therefore this reflector should cover the same general angular coverage from .5° to 10° but with a notch or null line appearing at 3°. FIG. 9 shows a reflector having such a pattern.

Figure 10:
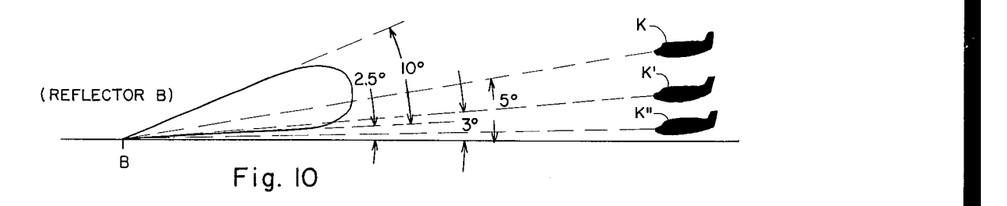

However, if the aircraft is still within the coverage of the system itself but not on the desired glide path, the reflectors B or D should be missing depending on whether the aircraft is too high or too low. FIG. 10 shows the reflector B having a pattern which is suitable to warn the aircraft if it is too low, and therefore the lobe pattern of the reflector B should be visible to the aircraft only if the aircraft is on the desired glide slope or too high, meaning that the reflection is absent if the aircraft is too low. The pattern of this beam extends from about 3° up to about 10°. For example, the aircraft K which is flying above the 3° glide path will see the reflection from the reflector B, and also on aircraft which is flying on the desired glide path at position K' will see the reflection from the reflector B, but an aircraft flying below the pattern as shown in position K" will not see the reflection from reflector B and will therefore be warned that it is flying too low.

Figure 11:
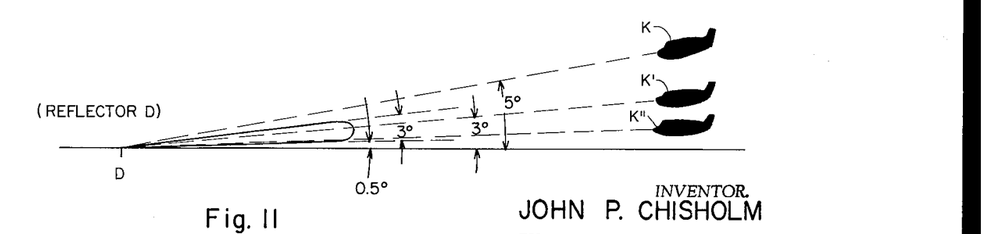

FIG. 11 shows the pattern which the reflector D should have according to the present modification of the general system in order to provide warning to aircraft which is flying too high. This reflector D is provided with a pattern which includes the 3° glide path and glide paths down to 0.5°, but which can not be seen by aircraft flying above the desired glide path, although it will be seen by aircraft flying below the path as in the position K". Thus, the fact that the reflector B is missing warns the aircraft that it is too high and that it should descend in order to reach the 3° glide path.

In these examples there is only one reflector in each side row, namely the reflector C, which has a notched pattern of the general type illustrated in FIG. 4, and all of the other reflectors need have only a single lobe in order to perform their functions properly.

Although the present invention is illustrated by examples employing five reflectors in each side row, it is to be understood that the invention is not to be limited to this number, but that other examples may include fewer or more reflectors. For example, if nine reflectors were used, this would involve adding two more reflectors on each side of reflector C, and these additional reflectors could have null lines respectively at 4°, 5°, 1° and 2° and thereby supplement reflectors B and D which could then be provided respectively with lobes above 5° and below 1°. In general, the more reflectors used in each side row, the more detailed the indication to the pilot of his exact vertical position.

Figure 12:
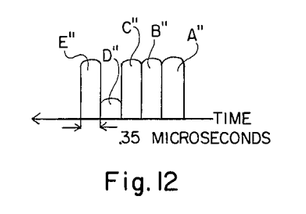
FIG. 12 is a time-sequence diagram illustrating the echo signal strengths received from various reflectors at one position of the aircraft.

Referring now to FIG. 12, this figure graphically shows amplitude of reflected signal versus time, and illustrates how the aircraft radar successively illuminates the beacons A, B, C, D and E, and how an aircraft flying somewhat high, for instance along the glide path leading to reflector D in FIG. 2 or FIG. 3, will see strong echo reflections A", B", C" and E", but will fail to receive a strong return reflection D".

FIGS. 13, 14 and 15 form a sequence which illustrates what happens when an aircraft approaches the system from some distance away. At a range outside of about 5 or 6 nautical miles, the radar will present a display showing the end markers G' and F' near the heading marker H of the P.P.I. scope. Between these two markers there will appear the markers A' through E' inclusive but at this range the markers will all blend together since the resolving power of the radar is not great enough to separate them at this range. A few moments later at closer range, the markers will begin to appear as in FIG. 14 and the display will have become enlarged toward the center of the P.P.I. screen so that there is now a considerable separation between the runway end markers F' and G', and so that the side markers will have divided into two parallel rows since at a closer range the aircraft radar will not illuminate both rows at the same instant of time. Note that in the illustration of FIG. 14, the aircraft is receiving an indication that it is high, and is therefore unable to see the marker D, but that it is lined up properly with the longitudinal center of the runway. Then, a few moments later, the radar will present a still larger and more detailed indication of the markers around the runway, and this indication still omits an image D' corresponding with the marker D, and therefore informs the pilot that he is still high and should descend until the marker D' appears and the marker C' disappears. The indication on the P.P.I. of FIG. 15 shows that the aircraft is still lined up with the longitudinal center of the runway, and all that is necessary to maintain such alignment is to keep the heading marker H at the upper center of the P.P.I. screen in line with the markers representing the reflectors F and G.

Figure 16:
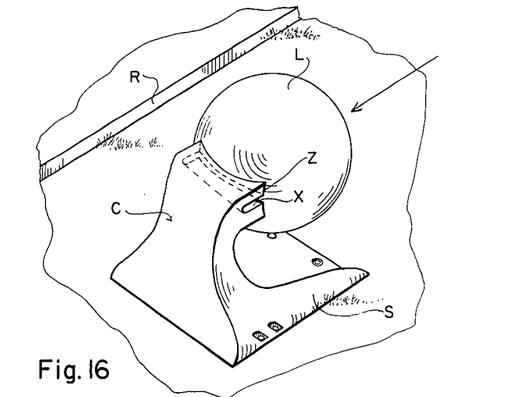
FIGS. 16 and 17 shows embodiments of two practical types of reflectors.
Figure 17:
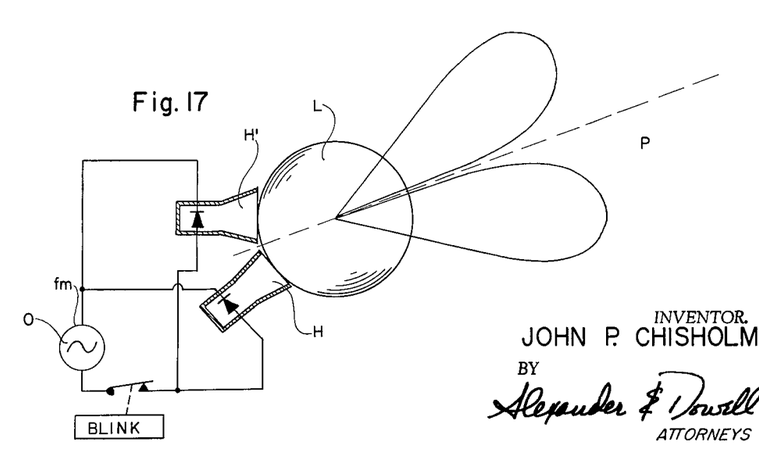

FIGS. 16 and 17 show embodiments of specific reflectors which can be used to implement the present invention. Both of these reflectors employ the well-known Luneberg lens comprising a plastic sphere which focuses electromagnetic radiation traveling in parallel lines on one side of the lens to a point on the opposite side of the lens at its surface, and vice versa. The type of reflector shown in FIG. 16 is particularly useful at the reflector position C since it provides two radiation lobes having a null line therebetween as shown in FIG. 4. The plastic lens L is supported on a stand S which has a reflective back plate Z. The surface of the back plate Z facing the lens L is substantially spherical and therefore can be fitted against the lens in complementary engagement therewith. This back plate Z has a transverse slot X that goes across it and may advantageously be filled with an absorbent material (not shown) so as to provide a discontinuity in the reflective pattern of the combined back plate Z and lens L when illuminated by parallel radiation aproaching the lens in the direction of the arrow. The angle subtended on the surface of the sphere by the portion of the back plate which lies above the slot X determines the angle of the lower lobe of the reflector in the vertical plane. The angle subtended on the surface of the sphere in the vertical plane by the portion of the back plate which lies below the slot X determines the angle in the vertical plane of the radiation pattern for the upper lobe of the reflector, and the angle subtended by the vertical height of the slot X determines the width of the null in the reflector pattern between the lobes. The latter should be quite narrow and sharply defined. On the other hand, the width of the back plate Z as measured in a horizontal plane determines the width of the lobes of the reflector in the azimuth direction, and it is believed that this width should be approximately 90° in order to make it easy for an approaching aircraft to intercept the landing pattern. The reflector shown in FIG. 16 is passive, meaning that it reflects what is impinged upon it substantially without modification thereof except for a certain amount of attenuation.

FIG. 17 shows a reflector system employing the spherical Luneberg lens L, but employing two horns H and H' instead of a back plate Z. These horns are normally reflective, but their degree of reflectivity can be modulated or varied by biasing the diodes which appear inside of the horns, and which are alternately rendered conductive and nonconductive by an applied oscillation at the frequency $f_m$. Thus, the radiation reaching the horns H and H' through the lens L is modulated at the rate $f_m$ and is reflected back to the aircraft, so that the aircraft radar receives both a modulated component of echo signal and a nonmodulated echo. A suitable blinker, FIG. 17, is also included to change the reflectivity once every second or two as a means for further identifying these markers to approaching aircraft, preferably all of the reflectors in the system being blinked simultaneously. The details of the modulated reflector illustrated in FIG. 17 are described in the above mentioned co-pending applications of John P. Chisholm.

Figure 18:
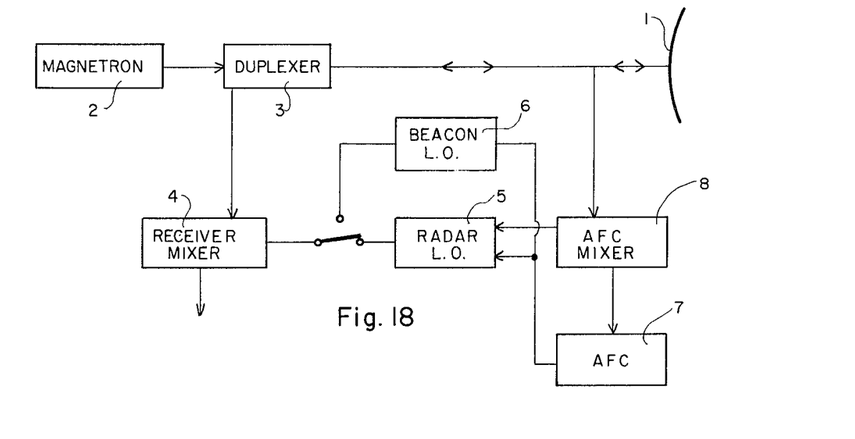
FIG. 18 is a block diagram of a conventional airborne radar of the type used in commercial airliners.

FIG. 18 shows a block diagram of a conventional airborne radar including an antenna 1 which is scanned by a mechanical scanner (not shown) and which is fed from a transmitter magnetron 2 through a duplexer 3. The receiver includes a mixer 4 which is also fed with echoes from the duplexer and with local oscillations either from a local oscillator 5 adjusted to provide a normal radar display, or from a local oscillator 6 adjusted to provide a beacon display. These local oscillators have their frequencies controlled by an automatic frequency control voltage 7 obtained by conventional means from an AFC mixer 8.

Figure 19:
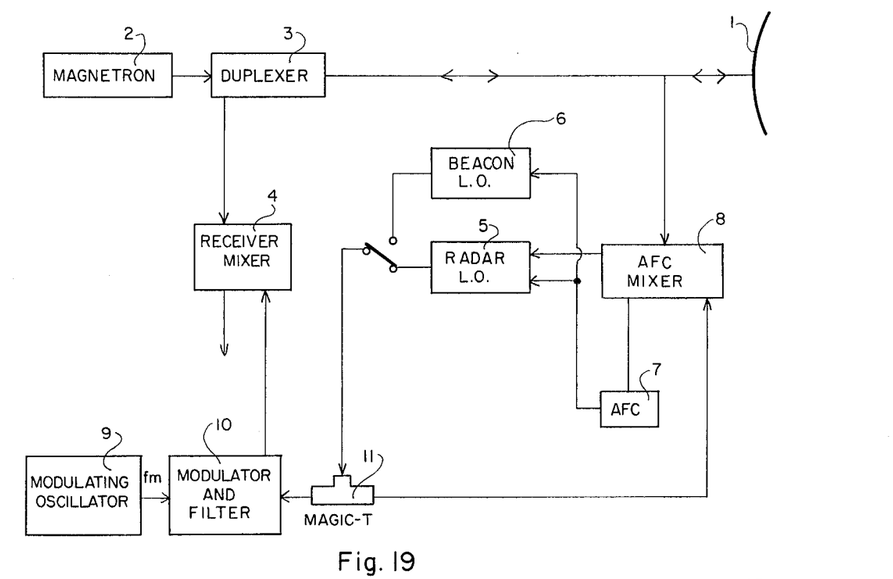
FIG. 19 is a block diagram of a radar similar to that shown in FIG. 18 but modified to provide a beacon function when used in cooperation with a modulated reflector as shown in FIG. 17.

FIG. 19 shows how this conventional circuit can be modified by insertion of a simple modulating oscillator 9 and a modulator and filter circuit 10 coupled with the existing radar local oscillators 5 or 6 by a magic T which also couples the modulator filter 10 with the AFC mixer. In this manner, only the units 9, 10 and 11 need to be added to the ordinary radar in order to make it possible for it to perform other and different beacon functions than the one performed by the beacon local oscillator 6 in the standard aircraft radar. This additional beacon function serves to render the radar capable of seeing only modulated reflectors of the type shown in FIG. 17, which in this mode of operation would be the only indication appearing on the screen of the indicator unit. In effect, the modulating oscillator puts out a frequency $f_m$ which is of the same frequency as the $f_m$ of the oscillator O in FIG. 17, and this modulation is used to shift the frequency of the radar local oscillator 5 arriving at the modulator 10 through the magic T 11 by an amount equal to the frequency $f_m$. The modulator and filter 10 performs the function of either directly transmitting the local oscillation 5 to the receiver mixer 4 without change, or modulating that local oscillator signal to produce two sidebands and transmitting these sidebands while eliminating the original local oscillator signal.

Figure 21:
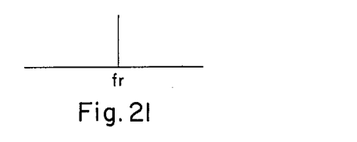
FIGS. 21, 22, 23 and 24 are illustrative diagrams showing local oscillator and reflection signals present in various units of FIG. 19.
Figure 22:
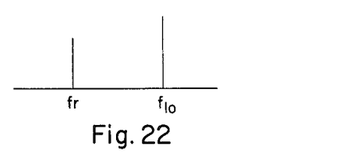
Figure 23:
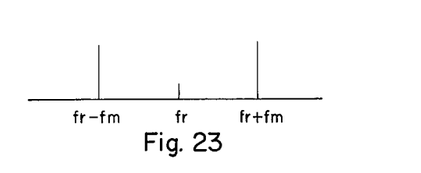
Figure 24:
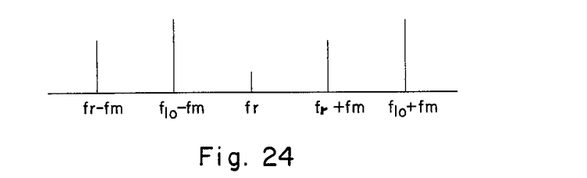

The radar transmitter transmits a radar frequency represented by $f_r$ in FIG. 21. This signal strikes the ground reflector of FIG. 17 and reflects back to the aircraft a spectrum of signals as shown in FIG. 23 including the radar frequency $f_r$ plus or minus the modulating frequency $f_m$. If the radar is performing its normal radar function, the signals entering the receiver mixer 4 comprise the reflected frequency $f_r$ and the frequency of the local oscillator $f_{lo}$ as shown in FIG. 22, but if the radar is performing in the beacon mode using the modulating frequency $f_m$, then the signals shown in FIG. 24 enter the mixer 4. These signals include a component comprising the radiated frequency $f_r$, sideband frequencies from the ground reflectors comprising $f_r+f_m$ and $f_r-f_m$, and sideband frequencies comprising a mixture of local oscillator $f_{lo}$ plus and minus the modulating frequency $f_m$. From the diagram of FIG. 24, it can be seen that the ground return $f_r$ does not have a local oscillation to mix with, but that both of the modulated sidebands $f_r+f_m$ and $f_r-f_m$ have local oscillations $f_{lo}+f_m$ and $f_{lo}-f_m$ to mix with and produce an I.F. output. It further appears that by beating together selected ones of the sideband frequencies $f_r$ plus and minus $f_m$ with the proper local oscillator frequency $f_{lo}$ plus or minus $f_m$, the output of the receiver can be made to include only echoes returning to the aircraft radar from ground reflectors modulated at the rate $f_m$.

Figure 20:
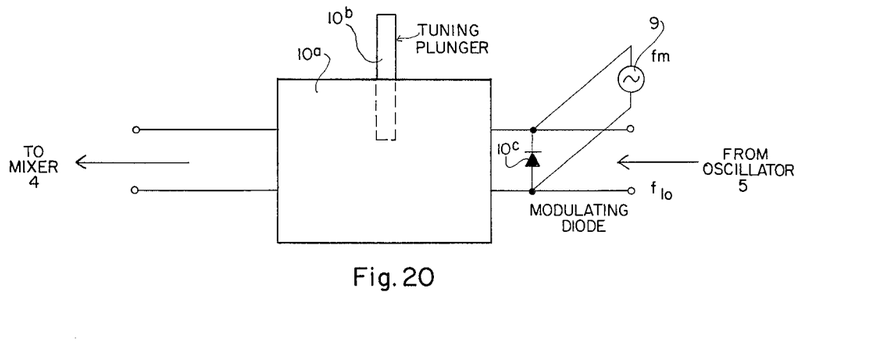
FIG. 20 is a diagram showing a suitable modulator and filter for use in the modified radar of FIG. 19.

Referring to FIG. 20, this figure shows a filter 10a which comprises a simple fixed tuned waveguide device having an adjustment plunger 10b, and the modulator of the unit 10 comprises a modulating diode 10c which modulates the input from the local oscillator 5 at the rate $f_m$. The function of the tunable filter 10a is to filter out the frequency of the local oscillator $f_{lo}$ when the mixing diode 10c is producing the sidebands comprising $f_{lo}$ plus or minus $f_m$. It is necessary that the frequency $f_m$ be sufficient to move the normal radar reflection $f_r$ outside of the band width of the receiver so that these normal reflection signals will not be viewed when the set is performing a beacon function cooperatively with modulated reflectors of the type shown in FIG. 17.

This invention is not to be limited to the particular types of reflectors shown in the drawings for purposes of illustration because of the fact that there are so many other kinds of reflectors which could also be used to good advantage in the present system, i.e. other lens systems of antenna arrays. Numerous other modifications of the system are also possible within the scope of the following claims.

I claim:

1. A system of radar reflectors for marking the azimuth position and slope of a preferred glide path approach to a runway, comprising plural side reflectors spaced in rows along and marking the longitudinal sides of the runway and facing toward said approach path, and lens means located in front of at least one of the reflectors located adjacent to the intersection of the preferred glide path with the runway and said lens means in combination with its associated reflector providing a composite reflectivity pattern extending toward the approach path and comprising in the vertical plane two lobes of high reflectivity located respectively above and below a sharply defined null line therebetween and said null line extending up said glide path and being coincident with its slope.

2. In a system as set forth in claim 1, at least one end reflector located at and marking each end of the runway and aimed to provide a reflective pattern extending upwardly along the glide path and fanning out on all sides thereof.

3. In a system as set forth in claim 1, lens means in front of each of said side reflectors and providing a null line in the vertical pattern making the same angle with the horizontal as said glide path.

4. In a system as set forth in claim 1 lens means in front of each of said side reflectors except the ones at the ends of the rows and said lens means providing, a null line in the vertical pattern making the same angle with the horizontal as said glide path.

5. In a system as set forth in claim 1, lens means in front of most of said side reflectors, and each providing a null line in the vertical pattern, the side reflectors preceding said one reflector at said intersection having their null lines disposed at angles less than the angle of said glide path and the side reflectors following said one reflector having their null lines disposed at angles greater than said glide path.

6. In a system as set forth in claim 5, all of said lens means being disposed to provide null line angles in the same row which are different from the others and progressively increasing along the runway to form a divergent composite pattern.

7. In a system as set forth in claim 1, lens means in front of the side reflectors preceding said one reflector at said intersection and each providing a single lobe located principally above the glide path, and other lens means in front of the side reflectors following said one reflector and each providing a single lobe disposed principally below the glide path.

8. In a system as set forth in claim 7, lens means in front of the side reflectors immediately preceding and following said one reflector, and each providing lobes bordering on and including the preferred glide path.

9. In a system as set forth in claim 1, each side reflector comprising the combination of a Luneberg lens; and reflection means partly covering portions of the lens surfaces on the sides thereof facing away from said glide path.

10. In a system as set forth in claim 9, said reflection means comprising two metallic sectors overlying said surfaces of the lens and having a narrow gap therebetween diametrically opposite the glide path to provide a null coincident therewith.

11. In a system as set forth in claim 9, said reflection means comprising at least one microwave horn having a mouth facing the lens surface and having the axis of the horn disposed in the general direction of the glide path.

12. In a system as set forth in claim 11, each microwave horn including a circuit means for modulating its reflectivity; and cyclic means for periodically actuating said circuit means.

13. In a system as set fouth in claim 12, said cyclic means comprising a source of oscillations at a radiofrequency rate.

14. In a system as set forth in claim 12, said cyclic means comprising switch means operating at a sub-audible rate for intermittently changing the reflectivity of the horns to cause the reflections therefrom to appear to blink.

15. A radar landing system for indicating the azimuth and elevational position of an aircraft with respect to a preferred glide path intersecting a runway at a touchdown point, comprising a radar in the aircraft and having an indicator unit for representing the vicinity of the runway; a plurality of radar reflectors disposed around the runway and facing in the direction of said glide path to provide corresponding indications on said indicator unit, said plurality including on each longitudinal side of the runway a row of reflectors including a reflector adjacent to the touchdown point, and this reflector having lens means facing the glide path and providing a reflectivity pattern in the vertical plane including two lobes of high reflectivity located respectively above and below a sharply defined null line therebetween and said null line extending up said glide path and being coincident with its slope.

16. In a system as set forth in claim 15, lens means in front of each of said side reflectors and providing a null line in the vertical pattern making the same angle with the horizontal as said glide path.

17. In a system as set forth in claim 15, lens means in front of each of said side reflectors except the ones at the ends of the rows and said lens means providing a null line in the vertical pattern making the same angle with the horizontal as said glide path.

18. In a system as set forth in claim 15, lens means in front of most of said side reflectors and each providing a null line in the vertical pattern, the side reflectors preceding said one reflector at said intersection having their null lines disposed at angles less than the angle of said glide path and the side reflectors following said one reflector having their null lines disposed at angles greater than said glide path.

19. In a system as set forth in claim 18, all of said lens means being disposed to provide null line angles in the same row which are different from the others and progressively increasing along the runway to form a divergent composite pattern.

20. In a system as set forth in claim 15, lens means in front of the side reflectors preceding said one reflector at said intersection and each providing a single lobe located principally above the glide path, and other lens means in front of the side reflectors following said one reflector and each providing a single lobe disposed principally below the glide path.

21. In a system as set forth in claim 20, lens means in front of the side reflectors immediately preceding and following said one reflector, and each providing lobes bordering on and including the preferred glide path.

22. In a system as set forth in claim 15, each side reflector comprising the combination of a Luneberg lens; and reflection means partly covering portions of the lens surfaces on the sides thereof facing away from said glide path.

23. In a system as set forth in claim 22, said reflection means comprising two metallic sectors overlying said surfaces of the lens and having a narrow gap therebetween diametrically opposite the glide path to provide a null coincident therewith.

24. In a system as set forth in claim 22, said reflection means comprising two microwave horns one above the other and closely spaced by a small gap, and having their mouths facing the lens surface, the lower horn having an axis passing through the center of the lens and extending therebeyond as the center of an upper lobe of the reflector, and the upper horn having an axis passing through the center of the lens and extending therebeyond as the center of a lower lobe, and the gap between the horns being narrow and defining a sharp null between the lobes.

25. In a system as set forth in claim 22, said reflection means comprising at least one microwave horn having a mouth facing the lens surface and having the axis of the horn disposed in the general direction of the glide path.

26. In a system as set forth in claim 25, each microwave horn including circuit means for modulating its reflectivity; and a source of radio-frequency oscillations driving said circuit means.

27. In a system as set forth in claim 26, said radar including a receiver having a first local oscillator tuned for receiving echoes of the same frequency as the transmitted pulse of said radar; and a second local oscillator tuned for receiving echoes from said reflectors only at frequencies corresponding with said pulse frequency plus or minus the frequency of said oscillations.

References Cited by the Examiner

UNITED STATES PATENTS

| | | | |
|---|---|---|---|
| 2,520,088 | 8/1950 | King | 343—18 |
| 2,572,043 | 10/1951 | McElhannon | 343—18 |
| 2,763,002 | 9/1956 | Fitzgerald et al. | 343—18 |
| 2,921,305 | 1/1960 | Cole et al. | 343—18 |
| 3,157,877 | 11/1964 | Tatz | 343—108 |
| 3,159,837 | 12/1964 | Van Alstyne | 343—108 |
| 3,165,745 | 1/1965 | Pike | 343—108 |

LEWIS H. MYERS, *Primary Examiner.*

KATHLEEN H. CLAFFY, CHESTER L. JUSTUS,
*Examiners.*

D. MEXIC, G. M. FISHER, *Assistant Examiners.*